US012651999B2

(12) United States Patent
Gu

(10) Patent No.: US 12,651,999 B2
(45) Date of Patent: *Jun. 9, 2026

(54) METHOD FOR CONTROLLING PHOTOVOLTAIC POWER GENERATION, CONTROL DEVICE, AND PHOTOVOLTAIC POWER GENERATION SYSTEM

(71) Applicant: Huawei Digital Power Technologies Co., Ltd., Shenzhen (CN)

(72) Inventor: Guilei Gu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 54 days.

This patent is subject to a terminal disclaimer.

(21) Appl. No.: 18/295,323

(22) Filed: Apr. 4, 2023

(65) Prior Publication Data

US 2023/0246592 A1      Aug. 3, 2023

Related U.S. Application Data

(63) Continuation of application No. 16/682,260, filed on Nov. 13, 2019, now Pat. No. 11,652,442, which is a (Continued)

(30) Foreign Application Priority Data

May 31, 2017      (CN) .......................... 201710400777.0

(51) Int. Cl.
*H02S 50/00* (2014.01)
*H02J 3/38* (2006.01)
(Continued)

(52) U.S. Cl.
CPC .............. *H02S 50/00* (2013.01); *H02J 3/381* (2013.01); *H02J 3/46* (2013.01); *H02S 40/30* (2014.12); *H02J 2101/25* (2026.01)

(58) Field of Classification Search
CPC ...... H02J 3/38; H02J 3/383; H02J 3/46; H02J 3/12; H02J 3/36; H02J 1/10; H02J 1/102; (Continued)

(56) References Cited

U.S. PATENT DOCUMENTS

| | | |
|---|---|---|
| 8,212,408 B2 | 7/2012 | Fishman |
| 9,350,166 B2 | 5/2016 | Fishman et al. |

(Continued)

FOREIGN PATENT DOCUMENTS

| | | |
|---|---|---|
| CN | 102208883 A | 10/2011 |
| CN | 102570909 A | 7/2012 |

(Continued)

*Primary Examiner* — Daniel Kessie
(74) *Attorney, Agent, or Firm* — Maier & Maier, PLLC

(57)                ABSTRACT

Embodiments relate to the field of photoelectric technologies, and provide a method for controlling photovoltaic power generation, a control device, and a photovoltaic power generation system. The method is applied to the photovoltaic power generation system. The system includes at least one photovoltaic string and a control device, the photovoltaic string includes at least one photovoltaic module, each photovoltaic module includes a photovoltaic unit and an optimizer that is connected to the photovoltaic unit, and the photovoltaic unit includes at least one photovoltaic component. The method includes: periodically sending, by the control device, an output voltage reference value update instruction to an optimizer in each photovoltaic string; and receiving, by the optimizer in each photovoltaic string, the output voltage reference value update instruction, and updating an output voltage reference value according to the output voltage reference value update instruction.

20 Claims, 6 Drawing Sheets

Related U.S. Application Data continuation of application No. PCT/CN2018/088761, filed on May 28, 2018.

(51) Int. Cl.
| | |
|---|---|
| *H02J 3/46* | (2006.01) |
| *H02S 40/30* | (2014.01) |
| *H02J 101/24* | (2026.01) |

(58) Field of Classification Search
CPC .... H02M 3/335; H02M 3/33507; H02M 1/21; H02M 7/42; H02S 40/30; H02S 40/38; H02S 40/34; H02S 40/32; G05F 1/67; H01L 31/02; H01L 31/042; G01R 31/40
USPC ....... 307/78, 80, 82, 109, 66, 64, 23, 43, 38
See application file for complete search history.

(56) References Cited

U.S. PATENT DOCUMENTS

| | | | |
|---|---|---|---|
| 9,442,504 B2 | 9/2016 | Porter et al. | |
| 9,583,645 B2 | 2/2017 | Kim et al. | |
| 2011/0241433 A1 | 10/2011 | Sihler et al. | |
| 2012/0049635 A1 | 3/2012 | Schelenz et al. | |
| 2012/0080955 A1 | 4/2012 | Fishman et al. | |
| 2012/0139352 A1 | 6/2012 | Allen et al. | |
| 2012/0235498 A1 | 9/2012 | Johnson et al. | |
| 2013/0018607 A1 | 1/2013 | Jin et al. | |
| 2013/0249300 A1 | 9/2013 | Fishman et al. | |
| 2014/0008986 A1 | 1/2014 | Miyauchi et al. | |
| 2014/0132075 A1 | 5/2014 | Fishman et al. | |
| 2014/0183960 A1 | 7/2014 | Balachandreswaran et al. | |
| 2014/0319920 A1* | 10/2014 | Kuboyama | H02J 3/385 |
| | | | 307/82 |
| 2015/0364918 A1 | 12/2015 | Singh et al. | |
| 2016/0285264 A1 | 9/2016 | Urry et al. | |
| 2016/0329719 A1 | 11/2016 | Meyer et al. | |
| 2017/0229873 A1 | 8/2017 | Nishimura | |
| 2017/0288599 A1 | 10/2017 | Chapman et al. | |
| 2017/0346295 A1* | 11/2017 | Yoscovich | H02S 40/32 |
| 2018/0131321 A1 | 5/2018 | Xu et al. | |
| 2018/0234051 A1 | 8/2018 | Ni et al. | |
| 2018/0301905 A1 | 10/2018 | Dai et al. | |

FOREIGN PATENT DOCUMENTS

| | | |
|---|---|---|
| CN | 103477294 A | 12/2013 |
| CN | 105871325 A | 8/2016 |
| CN | 106026172 A | 10/2016 |
| CN | 107248843 A | 10/2017 |
| EP | 3605837 A1 | 2/2020 |
| JP | 2017078876 A | 4/2017 |
| WO | 2014169295 A1 | 10/2014 |

* cited by examiner

METHOD FOR CONTROLLING PHOTOVOLTAIC POWER GENERATION, CONTROL DEVICE, AND PHOTOVOLTAIC POWER GENERATION SYSTEM

CROSS-REFERENCE TO RELATED APPLICATIONS

This application is a continuation of U.S. patent application Ser. No. 16/682,260, filed on Nov. 13, 2019, which is a continuation of International Application No. PCT/CN2018/088761, filed on May 28, 2018. which claims priority to Chinese Patent Application No. 201710400777.0, filed on May 31, 2017. All of the afore-mentioned patent applications are hereby incorporated by reference in their entireties.

FIELD

The embodiments relate to the field of photoelectric technologies, a method for controlling photovoltaic power generation, a control device, and a photovoltaic power generation system.

BACKGROUND

A photovoltaic power generation system is a power generation system that converts solar energy into electrical energy after receiving light, and may include a number of photovoltaic components that are connected in series or in parallel in a particular combination. The photovoltaic components are mounted outdoors, and may be blocked, aged, or the like. This significantly affects a power generation capacity of the entire photovoltaic power generation system. An optimizer may be connected to each photovoltaic component in the photovoltaic power generation system, and the optimizer can convert an input voltage/current of the photovoltaic component into different output voltages/currents, to prevent the power generation capacity from being affected by factors such as blocking and aging, thereby improving power generation efficiency of the system to the utmost.

To ensure that a sum of output voltages of optimizers is less than a system voltage, different output voltage reference values need to be set for optimizers with different power. In addition, when some photovoltaic components are disconnected when failures occur or are connected when recovering from failures, the output voltage reference values of the optimizers need to be adjusted based on a change in a quantity of powered-on photovoltaic components in the system.

In the prior art, the photovoltaic power generation system has a central control unit that collects working information of all optimizers at scheduled time, including a voltage, a current, power, a temperature, and the like, uniformly processes the working information to calculate the output voltage reference values of the optimizers, and delivers the output voltage reference values of the optimizers one by one to the optimizers. The optimizers receive the output voltage reference values of the optimizers and adjust a working state based on the new output voltage reference values. However, an increased quantity of optimizers indicates more information to be collected by the central control unit and a larger calculation amount. When blocking or a component failure occurs, because a large amount of calculation consumes a relatively long time, the central control unit needs to wait for a very long time before delivering the output voltage reference values to the optimizers. Consequently, an adjustment process of each optimizer in the system is slow, leading to a significant loss of the power generation capacity.

SUMMARY

Exemplary embodiments described provide a method for controlling photovoltaic power generation, a control device, and a photovoltaic power generation system, so that when blocking or a component failure occurs, an optimizer in a photovoltaic power generation system can rapidly adjust an output voltage reference value, thereby preventing a power generation capacity of the system from being affected.

To achieve the foregoing objective, the following exemplary solutions are used in the embodiments.

According to a first embodiment, a method for controlling photovoltaic power generation is disclosed. The method is applied to a photovoltaic power generation system, where the photovoltaic power generation system includes at least one photovoltaic string and a control device, the photovoltaic string includes at least one photovoltaic module, each photovoltaic module includes a photovoltaic unit and an optimizer that is connected to the photovoltaic unit, and the photovoltaic unit includes at least one photovoltaic component. The method includes: periodically sending, by the control device, an output voltage reference value update instruction to the optimizer, where the output voltage reference value update instruction is used to instruct the optimizer to update an output voltage reference value; and receiving, by the optimizer, the output voltage reference value update instruction, and updating the output voltage reference value according to the output voltage reference value update instruction.

When a photovoltaic component is blocked or a photovoltaic component failure occurs, because a BUS of the system remains unchanged, an output voltage of an abnormal optimizer (an optimizer to which the blocked photovoltaic component is connected) is reduced, and an output voltage of a normal optimizer (an optimizer to which a non-blocked photovoltaic component is connected) is increased. When the output voltage of the normal optimizer reaches the output voltage reference value, the normal optimizer exits a maximum power point tracking (MPPT) state and enters a power limiting state, so that an output power of the optimizer is reduced, and an output power of the entire photovoltaic power generation system is also reduced. In the prior art, a control unit needs to wait for a very long time before delivering a new output voltage reference value to an optimizer. Consequently, an adjustment process of each optimizer in the system is slow, leading to a significant loss of a power generation capacity. however, the control device periodically delivers an output voltage reference value update instruction to the optimizer, so that when the foregoing failure occurs, the optimizer can rapidly adjust the REF (that is, the output voltage reference value) according to the received output voltage reference value update instruction, and the optimizer enters the MPPT state again to recover to original output power. In this way, the power generation capacity of the entire photovoltaic power generation system can be prevented from being affected by a single-point failure.

With reference to the first embodiment, in a first possible implementation of the first embodiment, the optimizer is a DC/DC converter, and a topology of the optimizer is any one of buck, boost, buck-boost, and boost-buck.

With reference to the first embodiment or the first possible implementation of the first embodiment, in a second possible implementation of the first embodiment, the photovoltaic power generation system includes at least two photovoltaic strings connected in parallel. Output ends of optimizers in each photovoltaic string are successively connected in series. An output of an inverter is connected to a power grid or a load. The power of the photovoltaic power generation system is directly proportional to a quantity of the at least two photovoltaic strings connected in parallel.

In other words, in a same photovoltaic string, an optimizer is connected to at least one photovoltaic component to form a photovoltaic module, neighboring photovoltaic modules are connected in series by using output ends of optimizers, and neighboring photovoltaic strings are connected in parallel by using the output ends of the optimizers. A larger quantity of photovoltaic strings indicates a larger quantity of optimizers in the photovoltaic strings and greater output power of the photovoltaic power generation system.

With reference to any one of the first embodiment or the possible implementations of the first embodiment, in a third possible implementation of the first embodiment, a communication manner between the control device and the optimizer is wired communication or wireless communication.

In other words, the control device may deliver the output voltage reference value update instruction to the optimizer in a wired communication manner, or may deliver the output voltage reference value update instruction to the optimizer in a wireless manner.

With reference to any one of the first embodiment or the possible implementations of the first embodiment, in a fourth possible implementation of the first embodiment, the output voltage reference value update instruction is a status parameter identifier, and the status parameter identifier is used to instruct the optimizer to update the output voltage reference value based on a preset adjustment coefficient; or the output voltage reference value update instruction carries an adjustment coefficient determined by the control device, so that the optimizer updates, after receiving the output voltage reference value update instruction, the output voltage reference value based on the adjustment coefficient that is determined by the control device before the control device sends the output voltage reference value.

In other words, when the output voltage reference value update instruction is a status parameter identifier, no adjustment coefficient is carried in the instruction, and an adjustment coefficient K is fixed. When the output voltage reference value update instruction carries an adjustment coefficient, the adjustment coefficient K is adjustable, and the optimizer may calculate a new output voltage reference value (REF) based on an actual current output voltage and the adjustment coefficient.

According to a second embodiment, a method for controlling photovoltaic power generation is disclosed. The method is applied to a photovoltaic power generation system, where the photovoltaic power generation system includes at least one photovoltaic string and a control device, the photovoltaic string includes at least one photovoltaic module, each photovoltaic module includes a photovoltaic unit and an optimizer that is connected to the photovoltaic unit, and the photovoltaic unit includes at least one photovoltaic component. The method includes:

periodically sending, by the control device, an output voltage reference value update instruction to the optimizer, where the output voltage reference value update instruction is used to instruct the optimizer included in each photovoltaic string in the photovoltaic power generation system to update an output voltage reference value.

With reference to the second embodiment, in a first possible implementation of the second embodiment, the output voltage reference value update instruction is a status parameter identifier, and the status parameter identifier is used to instruct the optimizer to update the output voltage reference value based on a preset adjustment coefficient.

With reference to the second embodiment and the first possible implementation of the second embodiment, in a second possible implementation of the second embodiment, before periodically sending, by the control device, an output voltage reference value update instruction to the optimizer, the method further includes: determining, by the control device, an adjustment coefficient corresponding to the optimizer, where the adjustment coefficient is used to instruct the optimizer to update the output voltage reference value based on the adjustment coefficient.

With reference to any one of the second embodiment and the possible implementations of the second embodiment, in a third possible implementation of the second embodiment, the output voltage reference value update instruction carries an adjustment coefficient.

According to a third embodiment, a control device is disclosed, including: a sending unit, configured to periodically send an output voltage reference value update instruction to an optimizer, where the output voltage reference value update instruction is used to instruct the optimizer to update an output voltage reference value. The optimizer is deployed in a photovoltaic power generation system, the photovoltaic power generation system includes at least one photovoltaic string and a control device, the photovoltaic string includes at least one photovoltaic module, each photovoltaic module includes a photovoltaic unit and an optimizer that is connected to the photovoltaic unit, and the photovoltaic unit includes at least one photovoltaic component.

With reference to the third embodiment, in a first possible implementation of the third embodiment, the output voltage reference value update instruction is a status parameter identifier, and the status parameter identifier is used to instruct the optimizer to update the output voltage reference value based on a preset adjustment coefficient.

With reference to the third embodiment and the first possible implementation of the third embodiment, in a second possible implementation of the third embodiment, the control device further includes a determining unit. The determining unit is configured to: before the sending unit periodically sends an output voltage reference value update instruction to the optimizer, determine an adjustment coefficient corresponding to the optimizer, where the adjustment coefficient is used to instruct the optimizer to update the output voltage reference value based on the adjustment coefficient.

With reference to the third embodiment and the second possible implementation of the third embodiment, in a third possible implementation of the third embodiment, the output voltage reference value update instruction carries an adjustment coefficient.

According to a fourth embodiment, a photovoltaic power generation system is disclosed. The photovoltaic power generation system includes at least one photovoltaic string and a control device, the photovoltaic string includes at least one photovoltaic module, each photovoltaic module includes a photovoltaic unit and an optimizer that is connected to the photovoltaic unit, and the photovoltaic unit includes at least one photovoltaic component. The control device is configured to periodically send an output voltage reference value update instruction to an optimizer in each photovoltaic string, where the output voltage reference value update instruction is used to instruct the optimizer in each photovoltaic string to update an output voltage reference value. The optimizer is configured to: receive the output voltage reference value update instruction, and update the output voltage reference value according to the output voltage reference value update instruction.

When a photovoltaic component is blocked or a photovoltaic component failure occurs, because a BUS of the system remains unchanged, an output voltage of an abnormal optimizer (an optimizer to which the blocked photovoltaic component is connected) is reduced, and an output voltage of a normal optimizer (an optimizer to which a non-blocked photovoltaic component is connected) is increased. When the output voltage of the normal optimizer reaches the output voltage reference value, the normal optimizer exits an MPPT state and enters a power limiting state, so that output power of the optimizer is reduced, and an output power of the entire photovoltaic power generation system is also reduced. In the prior art, a control unit needs to wait for a very long time before delivering a new output voltage reference value to an optimizer. Consequently, an adjustment process of each optimizer in the system is slow, leading to a significant loss of a power generation capacity. However, the control device may periodically deliver an output voltage reference value update instruction to the optimizer, so that when the foregoing failure occurs, the optimizer can rapidly adjust the REF (that is, the output voltage reference value) according to the received output voltage reference value update instruction, and the optimizer enters the MPPT state again to recover to original output power. In this way, the power generation capacity of the entire photovoltaic power generation system can be prevented from being affected by a single-point failure.

DETAILED DESCRIPTION OF THE EMBODIMENTS

The following describes the embodiments in detail with reference to the accompanying drawings.

Figure 1:
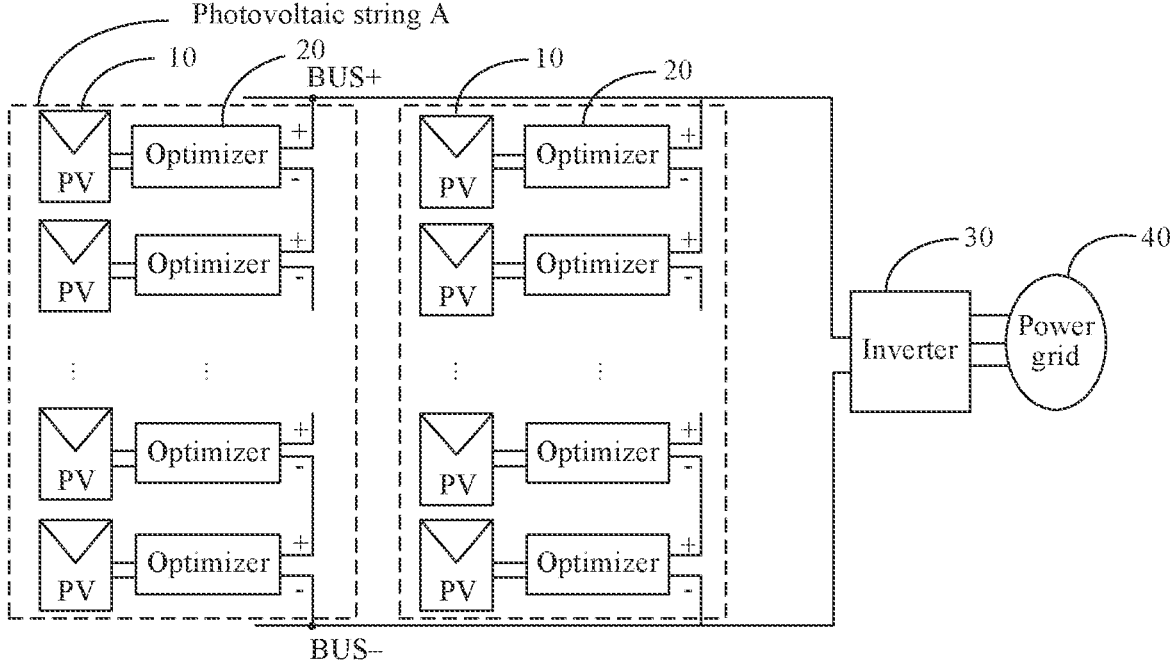
FIG. 1 is a schematic architectural diagram of an exemplary photovoltaic power generation system.

A photovoltaic power generation system converts solar energy into electrical energy after receiving light. As shown in FIG. 1, a photovoltaic power generation system includes: a photovoltaic (PV) component 10, an optimizer 20, an inverter 30, and a power grid 40. The photovoltaic component 10 is configured to convert solar energy into electrical energy. An output end of the photovoltaic component 10 is connected to an input end of the optimizer 20, to adjust an output voltage of the photovoltaic component, thereby having a function of voltage increasing or reducing. The inverter 30 manages all optimizers together. The inverter 30 implements direct current (DC)/alternating current (AC) conversion, to invert a direct current into an alternating current and send the alternating current to the power grid 40.

For example, as shown in FIG. 1, the photovoltaic power generation system may be divided into a photovoltaic string, a control device (which may be the foregoing inverter) and a power grid. For example, one photovoltaic power generation system may include at least one photovoltaic string, and the photovoltaic string is connected in parallel. Each photovoltaic string includes at least one photovoltaic module, each photovoltaic module includes a photovoltaic unit and an optimizer that is connected to the photovoltaic unit, and the photovoltaic unit includes at least one photovoltaic component. An output voltage of the at least one photovoltaic string is referred to as a BUS voltage. In addition, an output of the at least one photovoltaic string is connected to an input end of the inverter, and an output end of the inverter is connected to the power grid.

Photovoltaic modules in one photovoltaic string are successively connected in series, and 5 to 25 photovoltaic modules may be connected in series in one photovoltaic string. Each photovoltaic module may include a photovoltaic unit and an optimizer that is connected to the photovoltaic unit. The photovoltaic unit includes at least one photovoltaic component, the photovoltaic unit is connected to an input end of the optimizer, and output ends of all optimizers are connected in series to each other. For example, the optimizer has two output ends: a positive output end and a negative output end. A voltage between a positive output end of a first optimizer in the photovoltaic string and a negative output end of a last optimizer in the photovoltaic string is the foregoing BUS voltage. Moreover, in the photovoltaic string, a connection relationship between optimizers other than the first optimizer and the last optimizer is as follows: a positive output end of an optimizer is connected to a negative output end of an optimizer ahead of the optimizer, and a negative output end of the optimizer is connected to a positive output end of an optimizer following the optimizer.

It can be noted that, in the same or similar photovoltaic power generation systems, quantities of photovoltaic modules included in different photovoltaic strings are allowed to be different, and power of photovoltaic components is also allowed to be different. For example, different power differences are caused when models of photovoltaic components are different or when photovoltaic components are affected by external factors such as light and blocking. A photovoltaic component or an optimizer in which a failure occurs may be disconnected from the entire photovoltaic power generation system or may be connected when recovering from the failure.

For ease of understanding, some terms are described:

An output voltage reference value (REF) of an optimizer refers to a setpoint of an output voltage loop of the optimizer, and may be understood as that it is expected that an output voltage of the optimizer is maintained at the setpoint.

An MPPT state of an optimizer means that the optimizer works in MPPT without a PV energy loss, an output voltage loop of the optimizer does not work, and an output voltage of the optimizer is less than an output voltage reference value of the optimizer.

A power limiting state of an optimizer means that the optimizer works in non-MPPT with a PV energy loss, an output voltage loop of the optimizer works, and an output voltage of the optimizer is equal to an output voltage reference value of the optimizer.

A system voltage is a highest voltage that is allowed during working of a system. In any scenario, it can be ensured that a working voltage is less than the system voltage.

A BUS voltage reference value of an inverter is a setpoint of an input voltage loop of the inverter, and may be understood as that it is expected that an input voltage of the inverter is maintained at the setpoint.

A BUS voltage upper limit value of an inverter is equal to a sum of REFs of all optimizers in a photovoltaic string and may also be considered as a highest voltage set for normal working of the inverter. A BUS voltage (an actual output voltage) may be less than the BUS voltage upper limit value.

It can be noted that, the system voltage is greater than the BUS voltage upper limit value, and the BUS voltage upper limit value is greater than the BUS voltage reference value.

The foregoing terms are described below with reference to various examples. When a BUS voltage is controlled by an inverter, the inverter controls the BUS voltage to be maintained at 400 V. If output power of all photovoltaic components is the same, the BUS voltage is averaged by five optimizers, so that an actual output voltage of each optimizer is 80 V. In this case, the optimizer works in an MPPT state. Assuming that an output voltage reference value REF of an optimizer is 104 V, a BUS voltage upper limit value is 104 V*5=520 V, less than a system voltage 600 V.

In the prior art, a photovoltaic power generation system includes a central control unit. The central control unit may be an inverter, or may be an independent control module deployed in the system. The central control unit collects working information of all optimizers at scheduled time, including a voltage, a current, power, a temperature, and the like, uniformly processes the working information to calculate output voltage reference values of the optimizers, and delivers the output voltage reference values of the optimizers one by one to the optimizers. The optimizer receives the output voltage reference values delivered by the central control unit and adjusts a working state based on the received output voltage reference values. For example, during initialization, an actual output voltage of an optimizer is less than an output voltage reference value of the optimizer, and the optimizer works in the MPPT state. If the optimizer is abnormal, the actual output voltage is increased, and the optimizer works in a power limiting state after the actual output voltage reaches the current output voltage reference value of the optimizer. When a new output voltage reference value is received, the optimizer is readjusted to be in the MPPT state.

However, as a quantity of optimizers increases, the central control unit needs to collect a large amount of information before calculating the output voltage reference value of each optimizer. Therefore, an information collection process is slower and the central control unit needs to spend a large amount of time in performing a large amount of operation before obtaining the output voltage reference value of each optimizer. When some optimizers are blocked or failures occur in some optimizers, output power of the optimizers may be reduced. To prevent a power generation capacity of the entire system from being affected, a new output voltage reference value needs to be rapidly allocated for each optimizer, so that the optimizer adjusts a working state base on the new output voltage reference value. However, the central control unit needs to spend a large amount of time in performing the calculation, so that a system response is slower. In other words, after the foregoing case such as rapid blocking or component failure occurs, the central control unit needs to wait for a very long time before delivering an updated output voltage reference value to each optimizer. Consequently, an adjustment process of the system is slow and a loss of the power generation capacity is significant.

The embodiments provide a method for controlling photovoltaic power generation and a control device. A basic principle of the method is: a control device delivers an output voltage reference value update instruction to each optimizer in a photovoltaic power generation system, to instruct each optimizer in the system to adjust an output voltage reference value based on an adjustment coefficient, and further adjust a working state based on a new output voltage reference value. In this way, when blocking or a component failure occurs, the optimizer in the photovoltaic power generation system rapidly adjusts an output voltage reference value, and further adjust a working state base on a new output voltage reference value, so that the optimizer is prevented from being in a power limiting state for a long time and a loss of the power generation capacity of the system is small.

The following describes in detail implementations of the embodiments with reference to the accompanying drawings.

Figure 2:
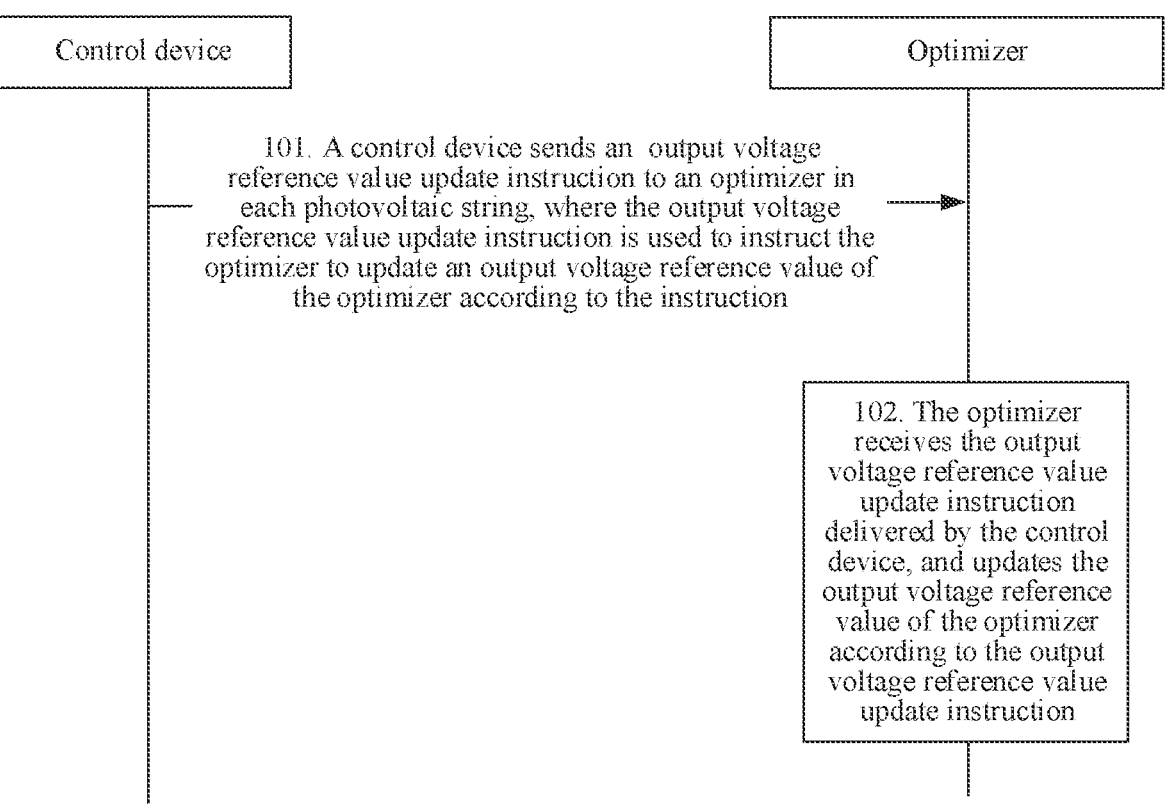
FIG. 2 is a flowchart of a method for controlling photovoltaic power generation according to an embodiment.

FIG. 2 is a flowchart of a method for controlling photovoltaic power generation according to an embodiment. The method is applied to the photovoltaic power generation system shown in FIG. 1. As shown in FIG. 2, the method may include the following steps.

In step 101, a control device sends an output voltage reference value update instruction to an optimizer in each photovoltaic string. The output voltage reference value update instruction is used to instruct the optimizer to update an output voltage reference value of the optimizer according to the instruction.

During an implementation, the output voltage reference value update instruction is a status parameter identifier, and the instruction does not carry any parameter such as an adjustment coefficient. When receiving the status parameter identifier (that is, the output voltage reference value update instruction) delivered by the control device, the optimizer updates the output voltage reference value based on a preset adjustment coefficient.

Alternatively, before step 101, the control device can determine an adjustment coefficient corresponding to each photovoltaic string. The adjustment coefficient is used to instruct each optimizer in each photovoltaic string in the photovoltaic power generation system to adjust an output voltage reference value of the optimizer based on the adjustment coefficient carried in the output voltage reference value update instruction. In this way, the output voltage reference value update instruction delivered by the control device to the optimizer in the photovoltaic string carries the adjustment coefficient determined by the control device for the photovoltaic string.

It can be noted that, when the output voltage reference value update instruction is a status parameter identifier, an adjustment coefficient K is fixed. When the output voltage reference value update instruction carries an adjustment coefficient, the adjustment coefficient K is adjustable, and the optimizer may calculate a new output voltage reference value REF based on an actual current output voltage and the adjustment coefficient.

In step 102, the optimizer receives the output voltage reference value update instruction delivered by the control device, and updates the output voltage reference value of the optimizer according to the output voltage reference value update instruction.

During an implementation, if the output voltage reference value update instruction is a status parameter identifier, the optimizer updates the output voltage reference value based on a preset adjustment coefficient.

If the output voltage reference value update instruction carries an adjustment coefficient, the optimizer determines a new output voltage reference value based on U*K, and updates the output voltage reference value of the optimizer to U*K. U is an actual current output voltage of each optimizer, and K is the adjustment coefficient.

In some embodiments, if a working state of the control device is a power non-limiting state and an actual BUS voltage is equal to a BUS voltage reference value, it is determined that the adjustment coefficient is a natural number greater than 1. It can be noted that, the BUS voltage is equal to a voltage of the photovoltaic string. For example, a BUS voltage upper limit value is equal to a sum of output voltage reference values of all optimizers in the photovoltaic string.

Further, the adjustment coefficient is a ratio of the BUS voltage upper limit value to the BUS voltage reference value, and the BUS voltage upper limit value is greater than the BUS voltage reference value. For example, the BUS voltage upper limit value is 440 V, and the BUS voltage reference value is 400 V, so that it can be determined that the adjustment coefficient is 440/400=1.1.

In some embodiments, if the working state of the control device is a power limiting state and the actual BUS voltage is greater than the BUS voltage upper limit value, it is determined that the adjustment coefficient is a natural number greater than 0 and less than 1, so that the BUS voltage (that is, an output voltage) of the photovoltaic string is reduced.

In the method provided in this embodiment, when a photovoltaic component is blocked or a photovoltaic component failure occurs, because a BUS of the system remains unchanged, an output voltage of an abnormal optimizer (an optimizer to which the blocked photovoltaic component is connected) is reduced, and an output voltage of a normal optimizer (an optimizer to which a non-blocked photovoltaic component is connected) is increased. When the output voltage of the normal optimizer reaches the output voltage reference value, the normal optimizer exits an MPPT state and enters a power limiting state, so that output power of the optimizer is reduced, and output power of the entire photovoltaic power generation system is also reduced. In the prior art, a control unit needs to wait for a very long time before delivering a new output voltage reference value to an optimizer. Consequently, an adjustment process of each optimizer in the system is slow, leading to a significant loss of a power generation capacity. However, the control device may periodically deliver an output voltage reference value update instruction to the optimizer, so that when the foregoing failure occurs, the optimizer can rapidly adjust the REF (that is, the output voltage reference value) according to the received output voltage reference value update instruction, and the optimizer enters the MPPT state again to recover to original output power. In this way, the power generation capacity of the entire photovoltaic power generation system can be prevented from being affected by a single-point failure.

Figure 3:
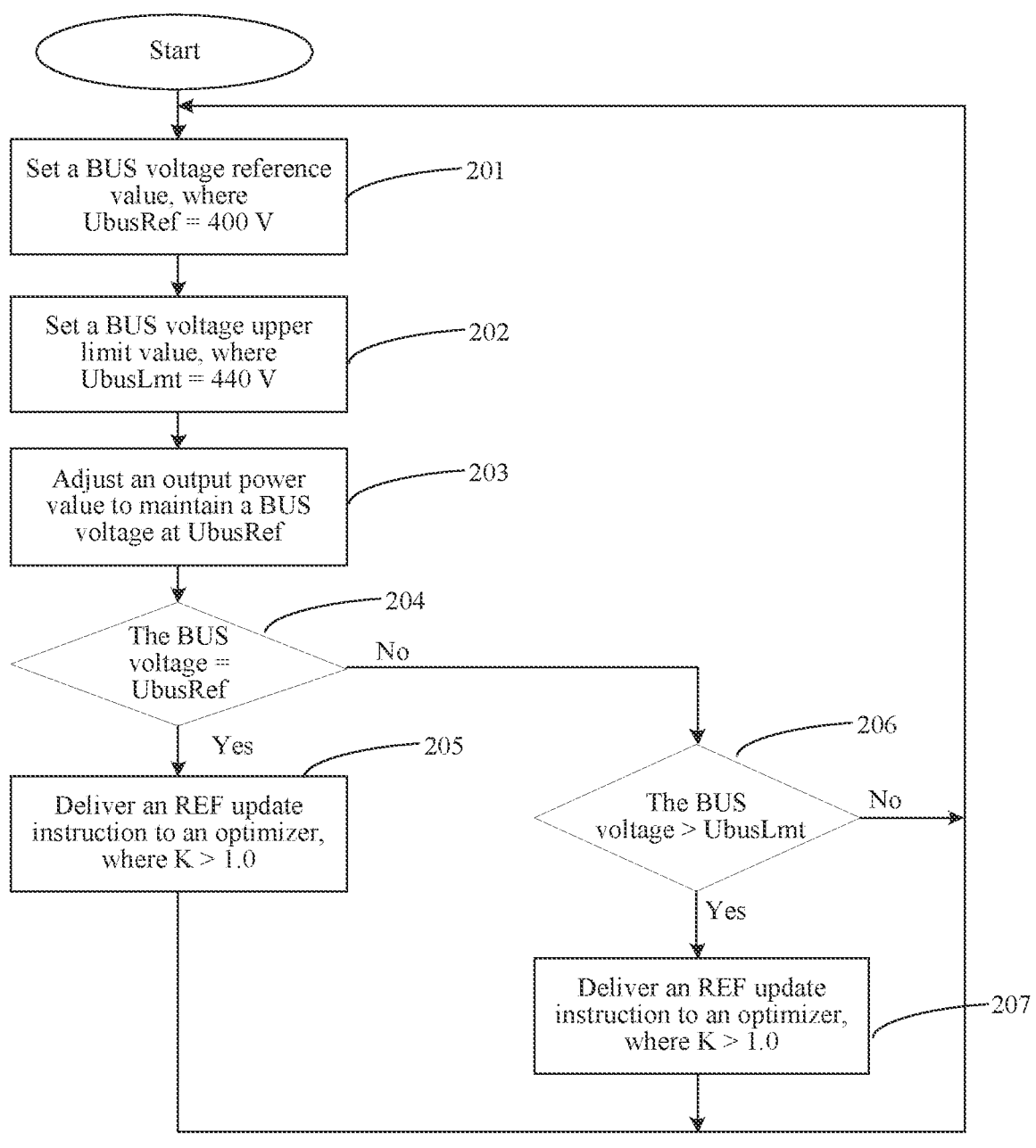
FIG. 3 is another flowchart of a method for controlling photovoltaic power generation according to an embodiment.

An embodiment further provides a method for controlling photovoltaic power generation. The method is applied to the photovoltaic power generation system shown in FIG. 1. Using a photovoltaic string A in FIG. 1 as an example, as shown in FIG. 3, the method may include the following steps.

In step 201, an inverter sets an optimal BUS voltage reference value based on a current scenario.

For example, the BUS voltage reference value is UbusRef=400 V.

In step 202 the inverter sets a BUS voltage upper limit value based on the BUS voltage reference value.

It can be noted that, it is ensured that the BUS voltage upper limit value may be greater than the BUS voltage reference value. However, the BUS voltage upper limit value needs to be less than a system voltage. For example, the system voltage is 600 V. The BUS voltage upper limit value is 1.1 times that of the BUS voltage reference value herein, that is, the BUS voltage upper limit value is UbusLmt=440 V.

In step 203, the inverter adjusts an output power value of each optimizer, to control a BUS voltage of the photovoltaic string to be maintained at the BUS voltage reference value.

In step 204, if the inverter is in an output-power non-limiting state and normally works, the BUS voltage is finally maintained at the reference value, and step 205 is performed; or if the inverter is in an output-power limiting state or in a shutdown state, the BUS voltage is greater than the reference value, and step 206 is performed.

In step 205, the BUS voltage is controlled by the inverter, and the inverter delivers a REF update instruction to indicate that K=1.1.

It can be noted that, the REF update instruction is the output voltage reference value update instruction described in the embodiments, and K is an adjustment coefficient. In this embodiment, K=BUS voltage upper limit value/BUS voltage reference value=440/400=1.1. In addition, the REF update instruction may carry the adjustment coefficient K, or may not carry any parameter. That is, the inverter and the optimizer pre-specify an adjustment coefficient, and when receiving the REF update instruction, the optimizer updates an output voltage reference value of the optimizer based on the specified adjustment coefficient.

In addition, all optimizers in each photovoltaic string in the photovoltaic system automatically adjust REFs. Because output currents of all optimizers in the photovoltaic string are the same, an optimizer having large power has a high output voltage and large REF, and an optimizer having small power has a low output voltage and small REF. Regardless of manners used by all the optimizers in the photovoltaic string to adjust the output voltages and the REFs of the optimizers, a sum of the output voltages of the optimizer and a sum of the REFs are unchanged, that is, the BUS voltage upper limit value of the inverter is unchanged.

In step 206, the BUS voltage is controlled by the optimizer, and in a normal scenario, the BUS voltage is maintained at the BUS voltage upper limit value, and 201 is returned to; or, in an abnormal scenario, the BUS voltage is higher than the BUS voltage upper limit value, and 207 is performed.

In step 207, The inverter delivers a REF update instruction indicating that K<1.0, so that all optimizers automatically reduce REFs, and the BUS voltage is reduced.

It can be noted that, when the inverter is in the power limiting state or the shutdown state, the output voltage of the optimizer is equal to the output voltage reference value. When the output voltage reference value of the optimizer is reduced, an actual output voltage of the optimizer is also reduced, and the BUS voltage is reduced.

Figure 4:
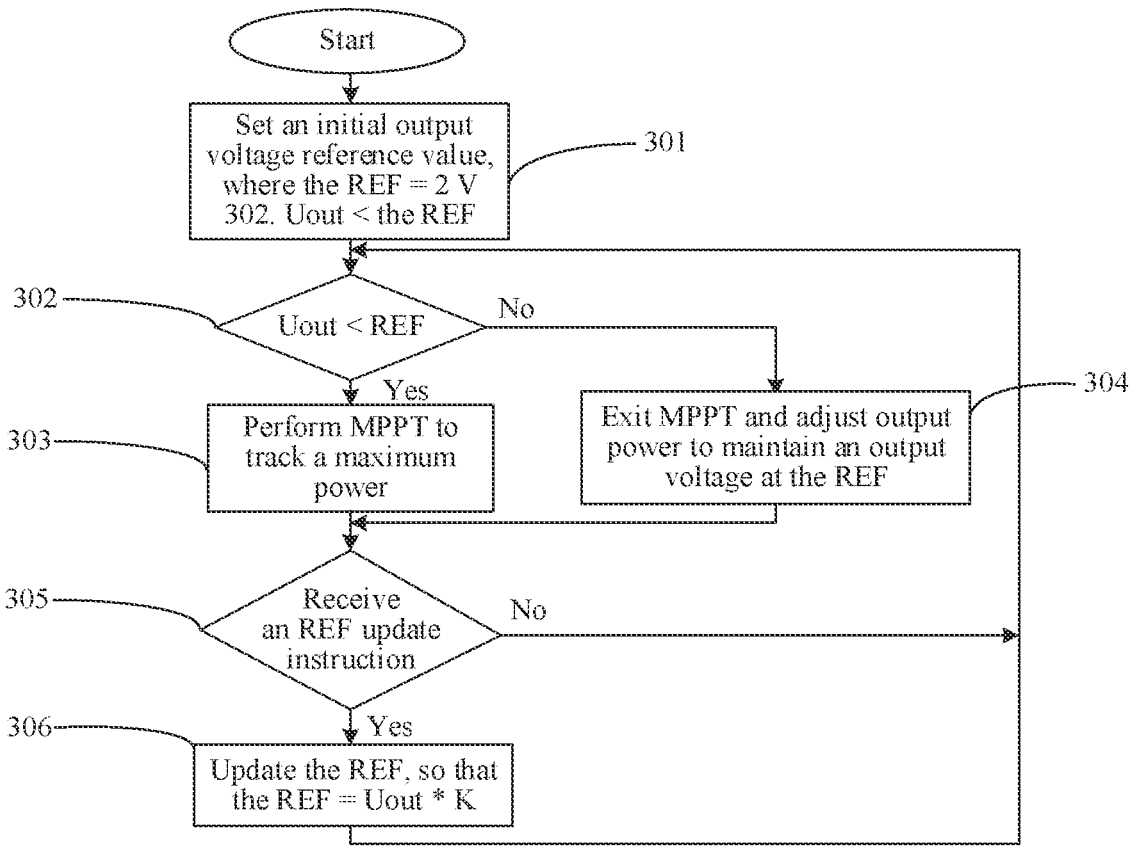
FIG. 4 is another flowchart of a method for controlling photovoltaic power generation according to an embodiment.

An embodiment further provides a method for controlling photovoltaic power generation. The method is applied to the photovoltaic power generation system shown in FIG. 1. Using a photovoltaic string A in FIG. 1 as an example, as shown in FIG. 4, the method may include the following steps.

In step 301, an optimizer sets an initial REF.

The initial REF is an initial output voltage reference value set by the optimizer for the optimizer. For example, the initial output voltage reference value REF=2 V.

In step 302, the optimizer determines whether an output voltage of the optimizer is less than the REF.

If the optimizer works in an MPPT state, an input voltage loop succeeds in competition and an output voltage loop fails in competition, so that the optimizer controls an input voltage and does not control the output voltage. That is, the output voltage (Uout) is less than the REF, so that step 303 is performed. If the optimizer works in a power limiting state, an input voltage loop fails in competition and an output voltage loop succeeds in competition, the optimizer does not control an input voltage but controls the output voltage, and Uout is equal to the REF (where the output voltage may be greater than the REF in an abnormal scenario), so that step 304 is performed.

In step 303, the optimizer enters an MPPT state, and output power varies with light.

In step 304, the optimizer exit an MPPT state and adjusts output power of the optimizer to control the output voltage of the optimizer at the REF.

In step 305, the optimizer waits for a REF update instruction delivered by an inverter, and if the optimizer receives the REF update instruction delivered by the inverter, step 306 is performed; otherwise, step 302 is returned to.

In step 306, after receiving the instruction, the optimizer automatically updates the REF to K times that of Uout.

That is, the REF is updated to Uout*K. Uout is an actual current output voltage of the optimizer. If the inverter is in an output-power non-limiting state and normally works, a BUS voltage is controlled by the inverter, and the inverter delivers a coefficient K>1.0. If some optimizers work in the power limiting state, and this is represented by that the output voltage=REF, after receiving the instruction, the optimizers proactively increase REFs, exit the power limiting state, and enter the MPPT state.

The following describes how to rapidly adjust, in the method provided in this embodiment, a system when a photovoltaic component is blocked or a photovoltaic component failure occurs.

The photovoltaic string A in FIG. 1 is used as an example for description. To simplify calculation, the following assumptions are provided.

The photovoltaic string A includes eight photovoltaic components that are connected in series, and maximum power of each photovoltaic component is 200 W.

A wire loss is ignored, and conversion efficiency of an optimizer is 100%.

An inverter sets a BUS voltage reference value to 400 V, a BUS voltage upper limit value is 440 V and less than a system voltage 600 V, and K=BUS voltage upper limit value/BUS voltage reference value, where K=1.1 herein.

If the inverter is in an output-power non-limiting state and normally performs grid-tied power generation, all optimizers work in an MPPT state, an output voltage is controlled by the inverter, and the inverter controls a sum of output voltages (a BUS voltage) of the optimizers to be 400 V. An input current of the inverter is $Is=(\Sigma Pn)/U_{BUS}=(200 W*8)/400 V=4 A$.

Pn represents power of an $n^{th}$ photovoltaic component, and Ubus is the BUS voltage. Further, it is obtained through calculation that the input current of the inverter is 4 A, and an output voltage of each optimizer is $U_0=Pn/Is=200 W/4 A=50 V$.

Because output power of all photovoltaic components is 200 W, output voltages of all optimizers are 50 V.

The inverter delivers a REF update instruction at scheduled time, where K=1.1. The optimizer calculates and updates the REF after receiving the instruction. A formula is as follows: $REF=U_0*K$.

A calculated REF is 55 V. If the power of the photovoltaic component is unchanged, the output voltage of the optimizer is unchanged, and the value of the REF is unchanged although the REF is being continually updated.

If the inverter is in a power limiting or shutdown scenario, delivering of an REF update instruction is paused, and the REF of the optimizer remains 55 V. Because the power of the photovoltaic component is greater than output power of the optimizer, the output voltage of the optimizer is naturally increased and is finally limited to 55 V, the BUS voltage is limited to 440 V and is maintained at the set upper limit value. In this case, the BUS voltage is controlled by the optimizer, and the optimizer works in a power limiting state.

Figure 5:
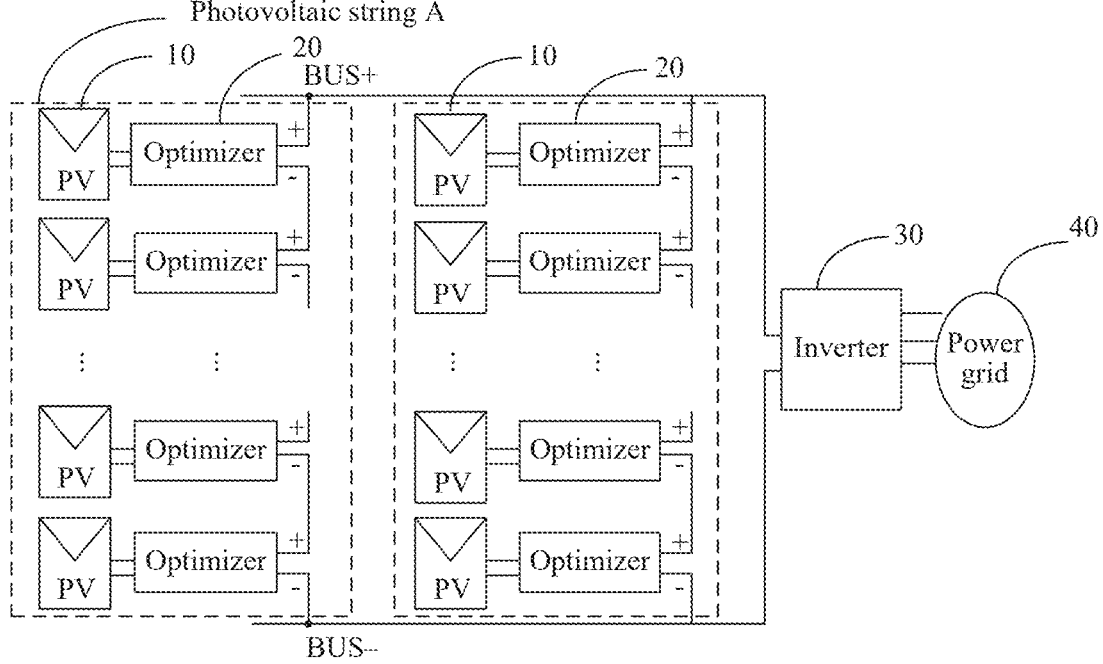
FIG. 5 is a schematic diagram showing that a photovoltaic component is blocked according to an embodiment.

As shown in FIG. 5, one photovoltaic component in the photovoltaic string A is blocked. When output power is reduced to 40 W, in an ideal scenario, the BUS voltage is maintained by the inverter at 400 V. In this case, according to the foregoing formula, the input current is reduced to (200 W*7+40 W)/400 V=3.6 A, an output voltage of an optimizer of a normal photovoltaic component (normal optimizer for short below) is increased to 200 W/3.6 A=55.56 V, and an output voltage of an optimizer of a blocked photovoltaic component (blocked optimizer) is reduced to 40 W/3.6 A=11.11 V.

Currently, the REFs of all optimizers are still 55 V. Therefore, the output voltage of the normal optimizer is greater than the REF, and the optimizer exits the MPPT state and enters the power limiting state. The output voltage of the blocked optimizer is less than the REF, and the blocked optimizer still works in the MPPT state. In an actual scenario, the inverter still maintains the BUS voltage at 400 V, the output voltage of the normal optimizer is equal to the REF and is 55 V, the output voltage of the blocked optimizer is 15 V (15 V=400 V-55 V*7). The input current of the inverter is 2.67 A (40 W/15 V), actual current total output power is 1067 W (55 V*2.67 A*7+40 W), less than total output power 1440 W (200 W*7+40 W) allowed by the system. This leads to a loss of a power generation capacity.

The inverter delivers an REF update instruction at scheduled time, where K=1.1, the optimizer calculates and updates the REF after receiving the instruction, so that an REF of the normal optimizer is increased to 60.5 V (55 V*1.1), and an REF of the blocked optimizer is reduced to 16.5 V (15 V*1.1). After the REF is increased, the normal optimizer exits the power limiting state and enters the MPPT state. The blocked optimizer still works in the MPPT state after the REF is reduced. The inverter still maintains the BUS voltage at 400 V. In this case, an output current is increased to 3.6 A, the output voltage of the normal optimizer is increased to 55.56 V, and the output voltage of the blocked optimizer is reduced to 11.11 V, and actual current total output power is 1440 W (55.56 V*3.6 A*7+40 W), equal to total output power allowed by the system, and system power has no loss.

When the inverter further delivers an REF update instruction, where K=1.1, the optimizer calculates and updates the REF after receiving the instruction, so that the REF of the normal optimizer is slightly increased to 61.11 V (55.56 V*1.1), and the REF of the blocked optimizer is slightly reduced to 12.22 V (11.11 V*1.1). All optimizers still work in the MPPT state, the system power has no loss and is stable again. The REFs of the optimizers no longer vary with the REF update instruction.

In this case, if the inverter is in the power limiting or the shutdown scenario, delivering of an REF update instruction paused, the REF of the normal optimizer is maintained at 61.11 V, the REF of the blocked optimizer is maintained at 12.22 V, and the output voltages of all the optimizers are naturally increased, and are finally limited at the REFs of the optimizers, and the BUS voltage is still limited at 440 V, that is, maintained at the set upper limit value. In this case, the BUS voltage is controlled by the optimizer, and all the optimizers work in the power limiting state.

The foregoing describes, from the perspective of interaction between devices, solutions provided in the embodiments. It may be understood that to implement the foregoing functions, the control device in the embodiments includes corresponding hardware structures and/or software modules for performing the functions. A person of ordinary skill in the art can be aware that, in combination with the examples described in the embodiments described herein, units, algorithms steps may be implemented by hardware or a combination of hardware and computer software. Whether a function is performed by hardware or hardware driven by computer software depends on particular applications. A person of ordinary skill in the art may use different methods to implement the described functions for each particular application, but it should not be considered that the implementation goes beyond the scope.

In the embodiments, the control device in the embodiments may be divided into functional modules according to the foregoing method embodiment. For example, the functional modules may be divided corresponding to the functions, or two or more functions may be integrated into one processing module. The integrated module may be implemented in a form of hardware, or may be implemented in a form of a software functional module. It can be noted that the division of the modules in the embodiments is an example and is merely division of logical functions. There may be other division manners during actual implementation.

Figure 6:
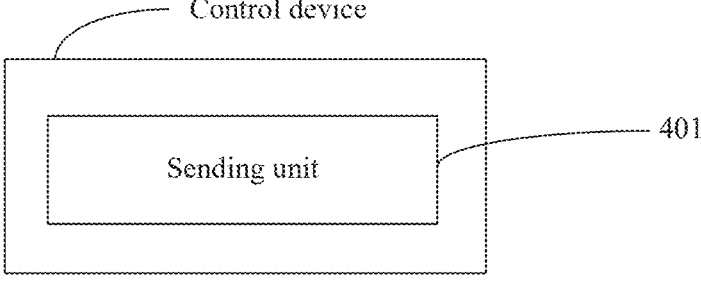
FIG. 6 is a schematic structural diagram of a control device according to an embodiment.

When the functional modules are divided based on corresponding functions, FIG. 6 is a possible schematic composition diagram of the control device in the foregoing embodiments. As shown in FIG. 6, the control device may include a sending unit 401.

The sending unit 401 is configured by the control device to perform step 101 in the method shown in FIG. 2.

Figure 7:
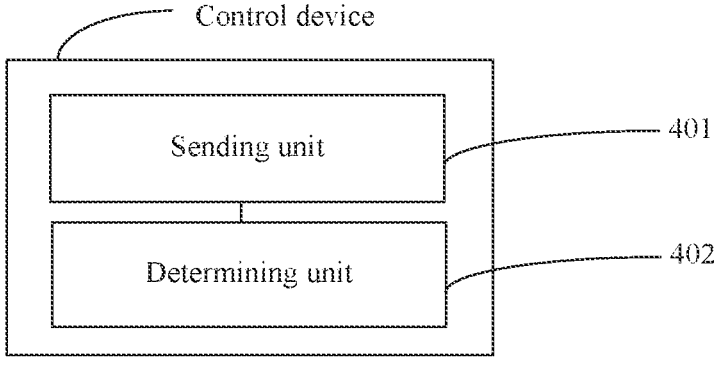
FIG. 7 is another schematic structural diagram of a control device according to an embodiment.

As shown in FIG. 7, the control device further includes a determining unit 402.

Figure 8:
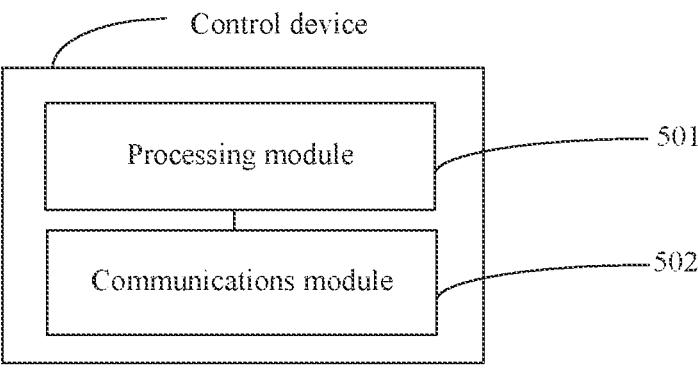
FIG. 8 is another schematic structural diagram of a control device according to an embodiment.

When an integrated unit is used, FIG. 8 is another possible schematic composition diagram of the control device in the foregoing embodiments. As shown in FIG. 8, the control device includes: a processing module 501 and a communications module 502.

The foregoing descriptions are merely exemplary implementations and are not intended to limit the protection scope of the claims. Any variation or replacement shall fall within the protection scope of the claims.

What is claimed is:

1. A method for controlling photovoltaic power generation, applied to a photovoltaic power generation system, the method comprising:

sending repetitively at scheduled time intervals, by a control device, a respective output voltage reference value update instruction to each of at least two optimizers, wherein the output voltage reference value update instruction is used to instruct each of the at least two optimizers to update a respective output voltage reference value and each optimizer being connected to at least one respective photovoltaic component;

wherein the at least each two optimizers are connected to respective photovoltaic components of the photovoltaic power generation;

receiving, by each optimizer of the at least two optimizers, the output voltage reference value update instruction, and updating the respective output voltage reference value according to the output voltage reference value update instruction, wherein the control device keeps sending the output voltage reference value update instruction to each of the at least two optimizers at the predetermined time interval, and during an operation of the photovoltaic power generation system, the output voltage reference value updating instruction is utilized by each respective optimizer to update the respective output voltage reference value directly based on a current output voltage of the respective optimizer; wherein the reference update instruction includes an adjustment coefficient.

2. The method according to claim 1, wherein each optimizer is a direct current DC/DC converter, and a topology of each optimizer is any one of buck, boost, buck-boost, or boost-buck.

3. The method according to claim 1, wherein a communication between the control device and each optimizer is one of wired communication or wireless communication.

4. The method according to claim 1, wherein the output voltage reference value update instruction is a status parameter identifier, and the status parameter identifier is used to instruct the optimizer to update the output voltage reference value based on the adjustment coefficient which is preset; or the output voltage reference value update instruction carries the adjustment coefficient determined by the control device, so that each optimizer updates, after receiving the output voltage reference value update instruction, the output voltage reference value based on the adjustment coefficient that is determined by the control device before the control device sends the output voltage reference value.

5. A method for controlling photovoltaic power generation, applied to a photovoltaic power generation system, the method comprising:

sending repetitively at scheduled time intervals, by a control device, an output voltage reference value update instruction to each of at least two optimizers, wherein the output voltage reference value update instruction is used to instruct each of the at least two optimizers to update a respective output voltage reference value, wherein the output voltage reference value update instruction is sent periodically, wherein the at least each two optimizers are connected to respective photovoltaic components of the photovoltaic power generation;

wherein the control device keeps sending the output voltage reference value update instruction to the at least two optimizers periodically, during an operation of the photovoltaic power generation system, and the reference update instruction includes an adjustment coefficient; and wherein the respective output voltage reference value updating instruction is utilized by each respective optimizer to update the respective voltage reference value directly based on a current output voltage of the respective optimizer.

6. The method according to claim 5, wherein the output voltage reference value update instruction is a status parameter identifier, and the status parameter identifier is used to instruct each optimizer to update the output voltage reference value based on the adjustment coefficient which is preset.

7. The method according to claim 5, wherein before periodically sending, by the control device, of the output voltage reference value update instruction to each optimizer, the method further comprises:

determining, by the control device, the adjustment coefficient corresponding to each optimizer, wherein the adjustment coefficient is used to instruct each optimizer to update the output voltage reference value based on the adjustment coefficient.

8. The method according to claim 7, wherein the output voltage reference value update instruction carries the adjustment coefficient.

9. A control device, configured to repetitively send an output voltage reference value update instruction to each optimizer of a plurality of optimizers at scheduled times, wherein the output voltage reference value update instruction is used to instruct the optimizer of the plurality of optimizers to update a respective output voltage reference value, wherein the plurality of optimizers are connected in series and deployed in a photovoltaic power generation system, the photovoltaic power generation system comprises at least one photovoltaic string and a control device, each photovoltaic string comprises the plurality of optimizers, wherein each optimizer is connected to at least one photovoltaic component, wherein the at least each two optimizers are connected to respective photovoltaic components of the photovoltaic power generation;

wherein the output voltage reference value update instruction is repetitively, at a predetermined time interval, sent to the optimizer of the plurality of optimizers in the each photovoltaic string, wherein the reference update instruction includes an adjustment coefficient, wherein the control device keeps sending the output voltage reference value update instruction to at least two of the plurality of optimizers at the predetermined time interval, during an operation of the photovoltaic power generation system, wherein the output voltage reference value updating instruction is utilized by each respective optimizer to update the respective voltage reference value directly based on a current output voltage of the respective optimizer.

10. The control device according to claim 9, wherein the output voltage reference value update instruction is a status parameter identifier, and the status parameter identifier is used to instruct each optimizer to update the output voltage reference value based on the adjustment coefficient which is preset.

11. The control device according to claim 9, further comprising:

a determining unit configured to: before the control device periodically sends the output voltage reference value update instruction to each optimizer, determine the adjustment coefficient corresponding to each optimizer, wherein the adjustment coefficient is used to instruct each optimizer to update the output voltage reference value based on the adjustment coefficient.

12. The control device according to claim 11, wherein the output voltage reference value update instruction carries the adjustment coefficient.

13. A photovoltaic power generation system, comprising:

at least one photovoltaic string and a control device, each photovoltaic string comprises a plurality of optimizers, each optimizer of the plurality of optimizers is connected to at least one photovoltaic component, output ends of all optimizers in the same string being connected in series to each other, wherein the at least each two optimizers are connected to respective photovoltaic components of the photovoltaic power generation; wherein the control device is configured to repetitively send an output voltage reference value update instruction at scheduled time to at least two of the plurality of optimizers in the same string in each photovoltaic string, wherein the output voltage reference value update instruction is used to instruct optimizers in each photovoltaic string to update an output voltage reference value; and the at least two of the plurality of optimizers are configured to:

receive the output voltage reference value update instruction, and update the output voltage reference value according to the output voltage reference value update instruction, wherein the reference update instruction includes an adjustment coefficient, wherein the output voltage reference value update instruction is repetitively, at a predetermined time interval, sent to the at least two of the optimizers in each photovoltaic string, wherein the control device keeps sending the output voltage reference value update instruction to the at least two of the plurality of optimizers at the predetermined time interval, during an operation of the photovoltaic power generation system, wherein the output voltage reference value updating instruction is utilized by each respective optimizer to update the voltage reference value directly based on a current output voltage of the respective optimizer.

14. The system according to claim 13, wherein the output voltage reference value is periodically updated and adjusted based on factors including at least one of the adjustment coefficient which is preset, and the adjustment coefficient is a ratio of an output voltage upper limit value to the output voltage reference value.

15. The system according to claim 14, wherein, when an actual output voltage of the photovoltaic string is equal to the output voltage reference value, the adjustment coefficient is determined as a value greater than 1.

16. The system according to claim 14, wherein, when an actual output voltage of the photovoltaic string is greater than the output voltage upper limit value, the adjustment coefficient is determined as a value greater than 0 and less than 1.

17. The system according to claim 13, wherein the output voltage reference value update instruction comprising a status parameter identifier, and the status parameter identifier is used to instruct the plurality of optimizers to update the output voltage reference value based on the adjustment coefficient which is preset; or the output voltage reference value update instruction carries the adjustment coefficient, so that the at least two of the plurality of optimizers update, after receiving the output voltage reference value update instruction, the output voltage reference value based on the adjustment coefficient.

18. The system according to claim 13, further comprising:

an inverter, wherein the control device is comprised in the inverter, the output ends of the at least two optimizers are connected to the inverter after being series connected with each other.

19. The method according to claim 1, wherein the respective output voltage reference value of each optimizer refers to a setpoint of an output voltage loop of the optimizer.

20. The method according to claim 5, wherein the respective output voltage reference value of each optimizer refers to a setpoint of an output voltage loop of the optimizer.

\* \* \* \* \*